H. A. BEAN.
WHEELED PLOW.
APPLICATION FILED APR. 25, 1912. RENEWED JUNE 5, 1913.

1,068,560.

Patented July 29, 1913.

2 SHEETS—SHEET 1.

Witnesses:
R. E. Hamilton
L. J. Fischer

Inventor:
Harry A. Bean,
By F. G. Fischer,
Atty.

H. A. BEAN.
WHEELED PLOW.
APPLICATION FILED APR. 25, 1912. RENEWED JUNE 5, 1913.

1,068,560.

Patented July 29, 1913.

2 SHEETS—SHEET 2.

Witnesses:

Inventor,
Harry A. Bean,
By F. G. Fischer,
Atty.

UNITED STATES PATENT OFFICE.

HARRY A. BEAN, OF LEROY TOWNSHIP, BARTON COUNTY, MISSOURI.

WHEELED PLOW.

1,068,560.  Specification of Letters Patent.  Patented July 29, 1913.

Application filed April 25, 1912, Serial No. 693,262. Renewed June 5, 1913. Serial No. 772,001.

*To all whom it may concern:*

Be it known that I, HARRY A. BEAN, a citizen of the United States, residing in Leroy township, in the county of Barton and State of Missouri, have invented certain new and useful Improvements in Wheeled Plows, of which the following is a specification.

My invention relates to improvements in wheeled-plows, and the present invention relates more particularly to means for controlling the front or steering-wheels of said plow, whereby the same are not only utilized to steer the plow, but also to assist in regulating the depth of the plow-shares.

Figure 1:
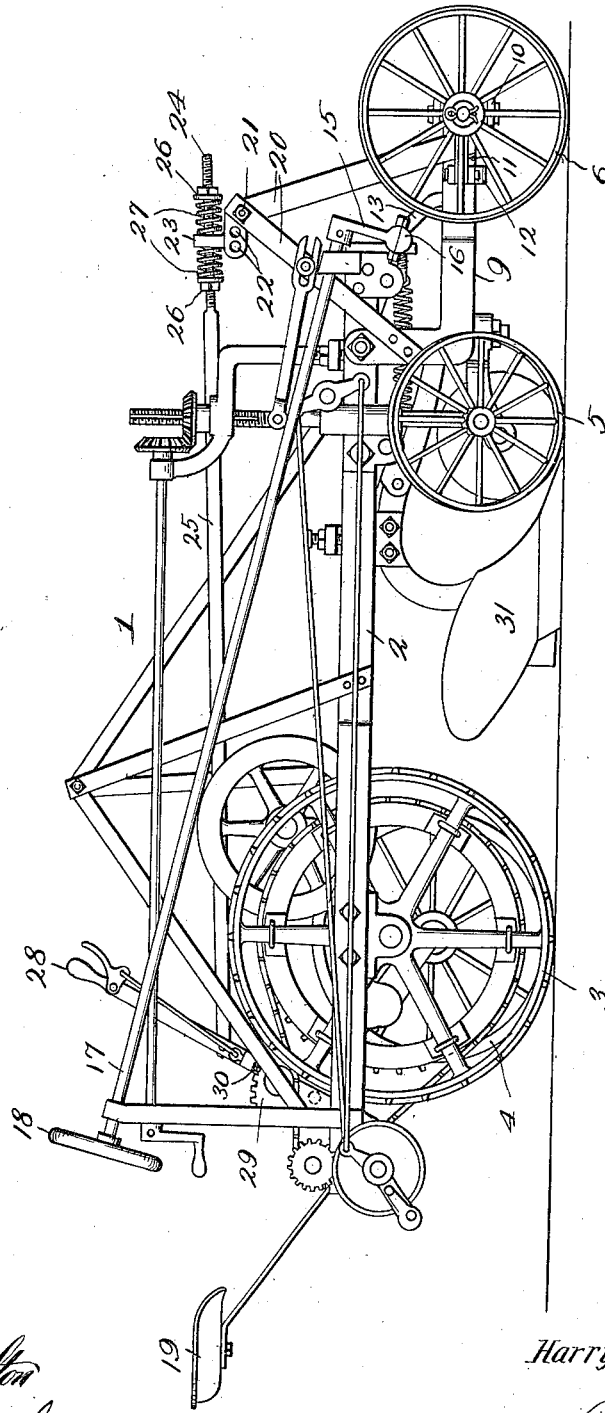
Figure 2:
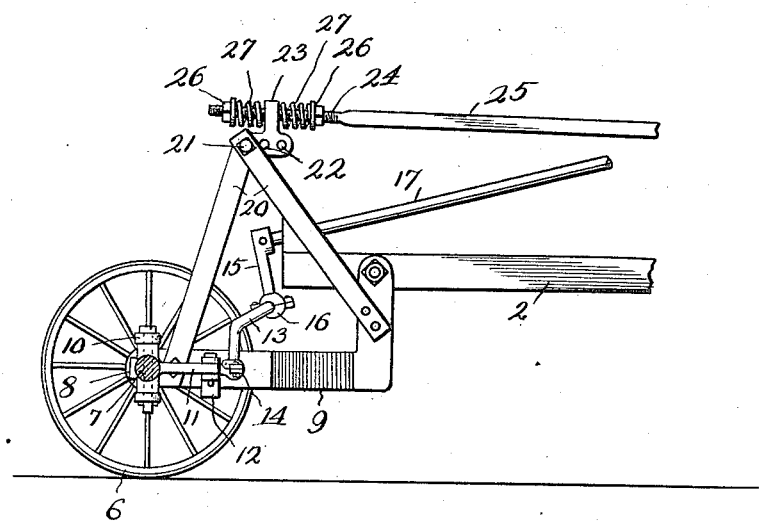
Figure 3:
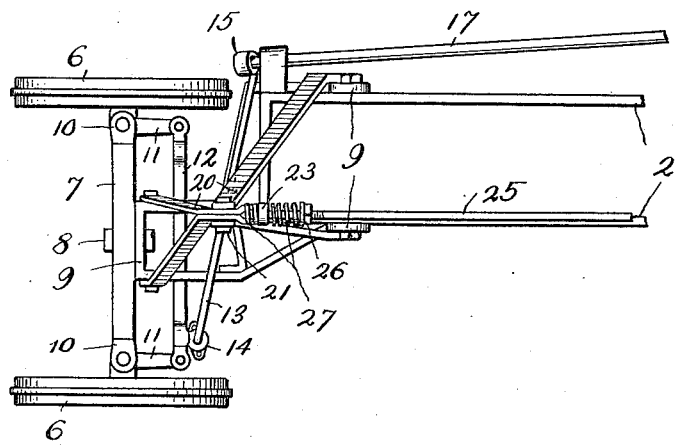

In order that the invention may be fully understood, reference will now be made to the accompanying drawings, in which:

Figure 1 is a side elevation of a plow embodying my invention. Fig. 2 is a broken side elevation of the plow showing the important features of the present invention. Fig. 3 is a plan view of the parts shown on Fig. 2.

1 designates a wheeled plow of any preferred form, but preferably of the type disclosed by my copending application filed February 5th, 1912, Serial No. 675,475.

2 designates the frame of the plow which is carried, in the present instance, on five wheels towit: a traction-wheel 3, a small rear wheel 4, an inclined land wheel 5, and a pair of front steering wheels 6. Steering-wheels 6 are mounted upon an axle 7 pivotally-secured by a pin 8 to the front end of a yoke 9 so that either wheel may move upward or downward over uneven ground without subjecting the frame 1 to torsional strains. Axle 7 is provided near each end with a steering-knuckle 10 to permit the wheels to turn to the right or to the left and thus guide the plow, said turning movement being controlled by steering means consisting of two crank-arms 11, secured at their forward ends to the steering-knuckles 10, a connecting-bar 12 pivotally-secured to the rear ends of said crank-arms, a pitman 13 connected at one end by a ball-and-socket joint 14 to the connecting-bar 12, a crank-arm 15 connected by a ball-and-socket joint 16 to the opposite end of the pitman 13, a shaft 17 upon one end of which crank-arm 15 is fixedly-mounted, and a steering-wheel 18, fixedly-mounted on the opposite end of said shaft so that it may be readily reached from the driver's seat 19. Yoke 9 is pivotally-secured at its rear upturned ends to the forward portion of frame 2 and is reliably braced by a plurality of reinforcing members 20, connected at their upper ends by a bolt 21. The two forward reinforcing members extend rearwardly and have perforations 22, any of which are adapted to receive the bolt 21 when it is desired to slightly adjust the forward end of frame 2 vertically. The rearward perforated extension has an upwardly-extending lug 23, through which the threaded forward end 24 of a connecting-rod 25 extends. The forward threaded end 24 of the connecting-rod 25 has nuts 26 located at opposite sides of lug 23 and bearing against springs 27, which in turn bear against opposite sides of the lug 23 to permit the front wheels 6 to move up and down slightly without moving the connecting-rod 25 longitudinally, said connecting-rod being normally locked from longitudinal movement by a hand-lever 28, operably-connected to a notched segment 29, engaged by a latch 30 on said hand-lever.

In practice, the land-wheel 5 is raised the distance it is desired to have the plowshare 31 enter the soil. The plow has then started forward and wheels 4 and 6 adjusted to lower frame 2 so that the plowshare may enter the soil, it being understood that said wheels 4 and 6 travel upon the unplowed ground, or the traction-wheel 3 travels in the furrow being made by the plowshare. The land-wheel 5 also travels upon the unplowed ground the first time around the field, but on the second time around, said land-wheel 5 enters the first furrow and thereafter travels in the furrow succeeding the one being made by the plowshare. As land-wheel 5 starts to enter the first furrow, it is adjusted to the bottom thereof, so that it will be on a level with the bottom of the plowshare and thus prevent the same from entering the soil beyond a predetermined distance.

Having thus described my invention what I claim and desire to secure by Letters Patent, is:

1. In a wheeled-plow, a pair of front wheels to guide said plow and assist in regulating the plowing depth, a yoke to which said wheels are operably-connected, said yoke being pivotally-secured to the forward portion of the plow-frame, a connecting-rod yieldingly-secured to said yoke to adjust the front end thereof vertically, and a lever for actuating said connecting-rod.

2. In a wheeled plow, a pair of front wheels to guide said plow and regulate the plowing depth, a yoke to which said wheels are operably-connected, said yoke being pivotally-secured to the forward portion of the plowing frame, reinforcing members on said yoke, a lug on said reinforcing members, a connecting-rod extending loosely through said lug to adjust the front end of the yoke vertically, springs embracing said connecting-rod and impinging against opposite sides of the lug, means on said connecting-rod to tension said springs, and means for actuating said connecting-rod.

3. In a wheeled-plow, a pair of front wheels to guide said plow and assist in regulating the plowing depth, a yoke to which said wheels are operably-connected, said yoke being operably-secured to the forward portion of the plow-frame, reinforcing members on said yoke adjustably-connected at their upper ends, a lug on certain of said reinforcing members, a connecting-rod extending loosely-through said lug to adjust the yoke vertically, coil-springs embracing said connecting-rod and abutting against opposite sides of said lug, means on said connecting-rod to compress said springs, and a hand-lever to actuate said connecting-rod.

In testimony whereof I affix my signature, in the presence of two witnesses.

HARRY A. BEAN.

Witnesses:
F. G. FISCHER,
E. C. LILLIAN.

---

Copies of this patent may be obtained for five cents each, by addressing the "Commissioner of Patents, Washington, D. C."